United States Patent [19]

Melchior et al.

[11] 4,026,115
[45] May 31, 1977

[54] SUPERCHARGED INTERNAL COMBUSTION ENGINES, IN PARTICULAR DIESEL ENGINES

[75] Inventors: Jean F. Melchior; Thierry Andre, both of Paris, France

[73] Assignee: The French State, Paris, France

[22] Filed: Mar. 28, 1975

[21] Appl. No.: 562,961

[30] Foreign Application Priority Data

Mar. 29, 1974 France .......................... 74.11011

[52] U.S. Cl. .................................. 60/614; 60/599; 60/615; 60/617; 60/619; 60/606
[51] Int. Cl.[2] ......................................... F02G 3/00
[58] Field of Search ............ 60/599, 606, 608, 614, 60/615, 617, 619, 595

[56] References Cited

UNITED STATES PATENTS

| 2,633,698 | 4/1953 | Nettel | 60/595 |
| 2,669,090 | 2/1954 | Jackson | 60/595 |

Primary Examiner—Ronald H. Lazarus
Attorney, Agent, or Firm—Barnes, Kisselle, Raisch & Choate

[57] ABSTRACT

A power plant comprises an internal combustion engine, (Diesel engine), a compressor for supercharging the engine and a turbine for driving the compressor. The turbine is fed in parallel by the exhaust conduit of the engine and by a passage communicating with the compressor outlet. The passage is divided into two parallel arms. The first arm has a throttle. The second arm is connected to the primary zone of an auxiliary combustion chamber via orifices of a cross-section such that the pressure drop produced between the upstream and downstream ends of the orifices of the second arm is the same as the pressure drop produced between the upstream and downstream ends of the throttle of the first arm. The combustion chamber is fed by a fuel supply system entering the primary zone in the region of the turbulence produced in this zone by the arrival of air through the orifices, so that a complete and stable combustion is achieved in the auxiliary combustion chamber.

28 Claims, 7 Drawing Figures

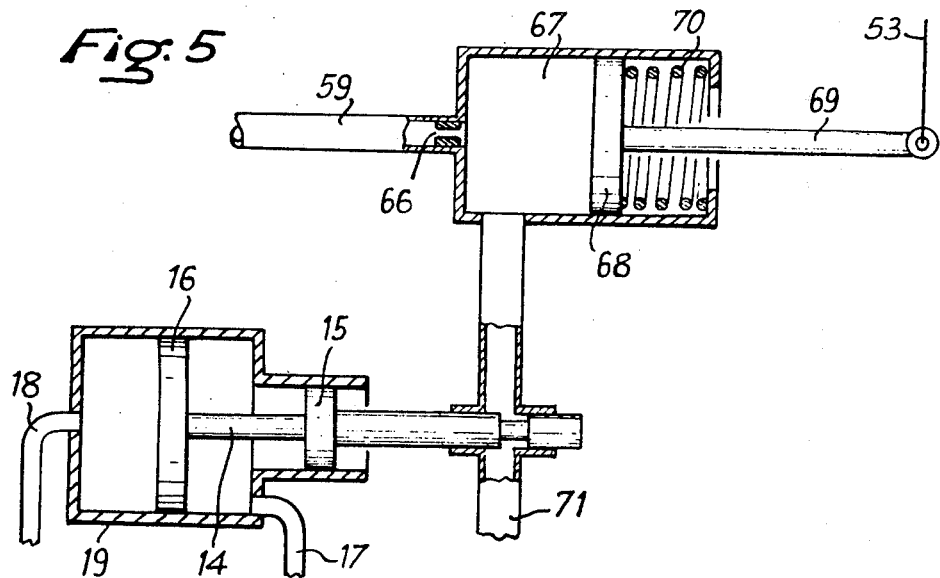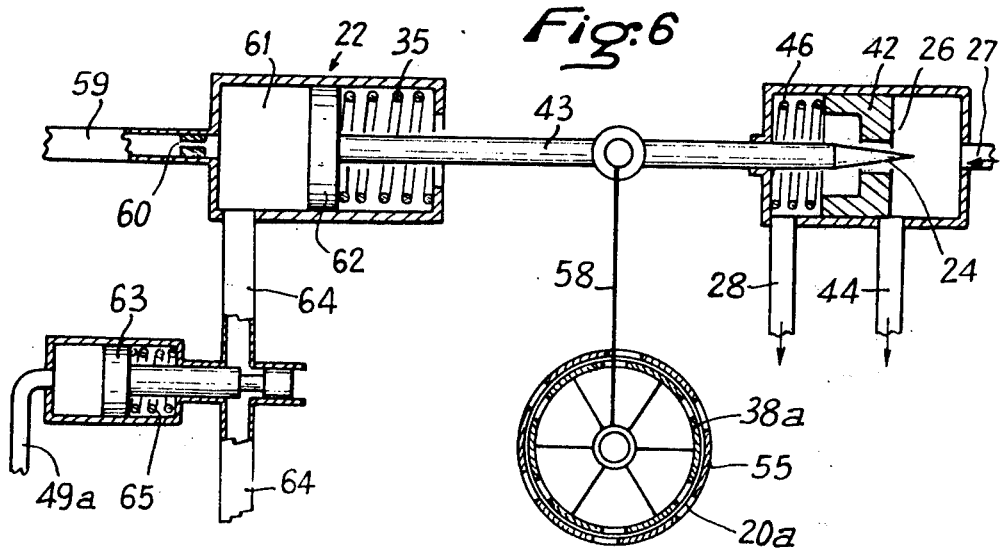

SUPERCHARGED INTERNAL COMBUSTION ENGINES, IN PARTICULAR DIESEL ENGINES

This invention relates to a power plant.

In particular, the invention concerns a power plant of the kind comprising: an internal combustion engine; a turbocompressor set for supercharging the engine and comprising a compressor, a turbine driving the same, and a passage communicating with the compressor outlet and the turbine inlet and serving to return to the turbine all that part of the compressor delivery which does not pass through the engine, the engine comprising a variable-volume working chamber so communicating via an inlet duct with the compressor outlet and via an exhaust duct with the turbine input as to be in parallel with at least some of the passage; an auxiliary combustion chamber divided into an upstream primary combustion zone, to which fresh air is supplied through the passage and fuel is supplied by a fuel supply system, and a downstream secondary dilution zone, to which fresh air is supplied through the passage and combustion gases through the exhaust duct, the secondary zone delivering hot gases to the turbine to help drive the same; and restricting means in the passage adapted to produce, between the air leaving the compressor and the gases entering the turbine, a pressure drop which is substantially independent of the ratio of the rate of air flow through the passage to the total air delivery from the compressor but which varies in the same direction as the pressure in such passage upstream of the restricting means.

The term "internal combustion engine having a variable-volume working chamber" is intended to denote any four-stroke or two-stroke engine having at least one working chamber in which the inlet, compression, combustion/expansion and exhaust phases occur. The term relates generally to engines in which the or each working chamber is bounded by a piston moving, in relation to a cylinder or casing, either in reciprocation or in rotation (Wankel or other engines), as opposed to internal combustion engines, such as gas turbines, which have a fixed-volume working chamber.

As the foregoing shows, the term "engine having a variable-volume working chamber" covers single-chamber and multiple-chamber engines. Also, a statement to the effect e.g. that the turbocompressor set comprises a compressor and a turbine or that the power plant comprises an auxiliary combustion chamber, means that such set comprises at least one compressor and at least one turbine and the power plant comprises at least one auxiliary combustion chamber, the terminology having been chosen in order to simplify disclosure of the invention.

Power plants of the kind hereinbefore outlined are disclosed by U.S. Pat. No. 3,988,894.

Before describing the improvements which the invention provides in such power plants, a parallel may usefully be drawn between variable-volume-chamber engines and constant-volume-chamber engines such as gas turbines. The working chamber of a gas turbine is required to provide not only complete combustion of the fuel introduced into the chamber, i.e. high combustion efficiency and no evolution of coke or soot, but also stable combustion and no unwanted extinction and blowing-out of the flame.

To meet these two requirements it is known for the turbine combustion chamber to be arranged as two separate zones, namely a primary zone, into which air and fuel are introduced in proportions near the stoichiometric ratio, and a secondary or dilution zone in which the very hot combustion gases produced in the primary zone are cooled by dilution with fresh air introduced through dilution orifices. For very full and stable combustion, the pressure drop of the air entering the primary zone must be sufficient to produce satisfactory turbulence therein but low enough not to impair the overall efficiency of the complete plant comprising the compressor, combustion chamber and turbine. Devising a satisfactory combustion chamber therefore involves the dilemma of arranging for a primary zone with high turbulence and very low pressure drop. The only way of achieving this requirement, of course, is to use combustion chambers having a pressure drop of the order of at least 5%.

It is an object of the invention to adapt the information gained from constant-volume-chamber engines to variable-volume-chamber engines at reasonable cost and while maintaining a high total plant efficiency.

According to the invention, in a power plant of the kind defined hereinbefore, the passage is divided into two parallel arms, a first such arm having the restricting means and terminating downstream of the primary combustion zone, the second arm of the passage being connected to the primary zone via at least one orifice of a cross-section such that the pressure drop is produced substantially between the upstream and downstream ends of the orifice, and the fuel supply system entering the primary zone in the region of the turbulence produced therein by the arrival of air through the orifice.

Since the pressure drop produced by the restricting means in such power plants may be more than 10% and even as much as 20% in some cases, using this pressure drop at the or each orifice through which the air enters the primary zone of the auxiliary combustion chamber is a means of providing in such zone the operating conditions which have been fouund to be very useful for gas turbines. Since the pressure drop is produced by existing means, modification costs are low and the overall efficiency of the plant is not reduced by any extra pressure loss.

The invention is not of course an obvious advance from the prior art. For instance, according to French Patent Application No. 73 10041 previously referred to, the restricting means for producing the pressure drop were disposed upstream of the auxiliary combustion chamber, and the same had a very different function from that of the combustion chamber of a gas turbine, at least in normal engine operating conditions.

Preferably, the power plant according to the invention comprises adjusting means for providing a correlative variation of the cross-section of at least one orifice and the effective delivery of the fuel supply system so as to provide in the auxiliary combustion chamber conditions close enough to the stoichiometric ratio for stable combustion in the latter chamber. The adjusting means can be controlled by a pilot element sensitive to a pressure at any place in the gas circuit connecting the compressor outlet to the turbine inlet, the pilot element being such that the cross-section of at least one orifice and the effective delivery of the fuel supply both vary, at least between a maximum and a minimum, in the opposite direction to the last-mentioned pressure and therefore to the pressure drop across the orifices, since the pressure drop is proportional to the relative pressure. Advantageously, the pilot element is biased against the pressure operative at the selected place in the gas circuit by the combined action of a return spring and an adjustable counter-pressure.

The adjusting means ensure that there is no risk of the flame in the auxiliary combustion chamber going out and also improve combustion efficiency.

Advantageously, a cooling air circuit for various engine elements and extending at its downstream end to the turbine inlet is taken from the first passage arm directly connected to the secondary zone and preferably joining the same upstream of the exhaust duct entry into such zone. The restricting means in the first passage arm are disposed at or near the junction thereof with the secondary zone of the auxiliary combustion chamber.

This feature makes it possible to have low-cost cooling means whose operation absorbs very little from the plant.

Preferably, the restricting means of the passage and the adjusting means for varying the cross-section of the or each orifice comprise three hollow coaxial elements, one of which is stationary and the other two of which are movable independently of one another, the stationary element providing an internal limmitation of at least some of the secondary zone of the auxiliary combustion chamber and cooperating with the first movable element, to form the restricting means, to bound a first series of orifices whose cross-section varies with the position of the first movable element, the second movable element cooperating with one of the other two elements, to form the adjusting means, to bound a second series of orifices whose cross-section varies with the position of the second movable element.

Restricting and adjusting means thus devised make it possible to have a very compact construction.

Preferably, the engine is of the compression ignition kind and the passage communicates continuously with the compressor outlet and the turbine input.

In order that the invention may be readily understood, embodiments thereof will now be described, by way of example, with reference to the accompanying drawings, in which:

FIGS. 5 and 6 are diagrammatic views of details of FIG. 4; and

Figure 1:
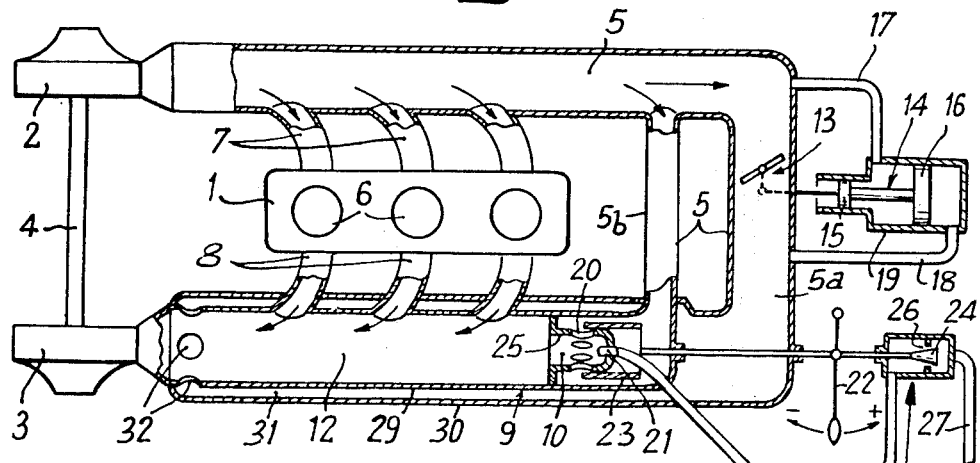
FIG. 1 is a diagrammatic plan view, with parts sectioned, of a diesel power plant according to a first embodiment of the invention.
Figure 2:
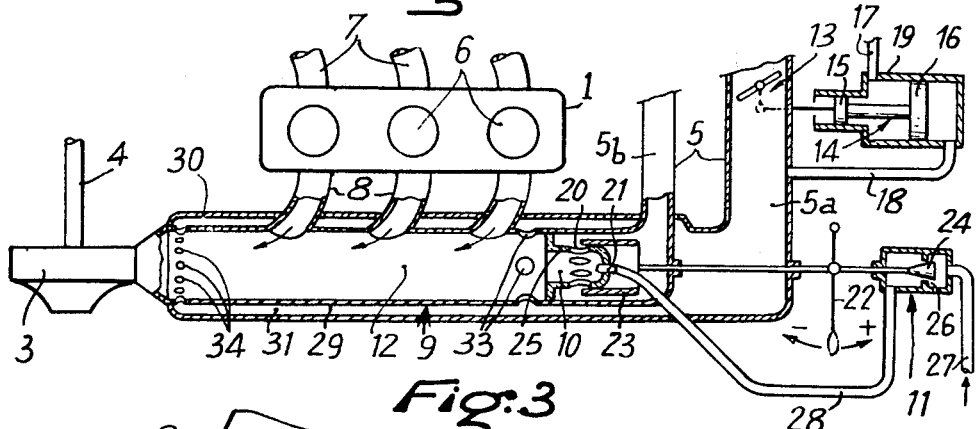
FIG. 2 is a diagrammatic plan view, with parts sectioned, of part of a power plant according to a second embodiment of the invention, the remainder of the plant being identical to the plant of FIG. 1.

Referring to FIGS. 1 and 2, a diesel engine 1 is supercharged by a turbocompressor set comprising a compressor 2, a turbine 3 driving the compressor via a shaft 4, and a passage 5 communicating, preferably continuously, with the outlet of compressor 2 and the inlet of turbine 3. The flow direction of air and other gas mixtures is indicated by arrows in FIGS. 1 and 2.

Engine 1 has a number of variable-volume working chambers 6, three such chambers being shown in FIGS. 1 and 2. The chambers 6 communicate via inlet ducts 7 with the outlet of compressor 2, as a rule via the upstream portion of passage 5, the chambers 6 communicating via exhaust ducts 8 with the inlet of turbine 3, as a rule via the downstream portion of passage 5, so that the chambers 6 are in parallel with at least some of passage 5.

The plant also comprises an auxiliary combustion chamber 9 divided into an upstream primary combustion zone 10, which receives fresh air through passage 5 and fuel from a fuel supply system 11, and a downstream secondary or dilution zone 12, which receives fresh air through passage 5 and combustion gases through the exhaust ducts 8 and which delivers hot gases to turbine 2 to help to drive the same.

The plant also comprises in passage 5 restricting means 13 adapted to produce, between the air issuing from compressor 2 and the gases entering turbine 3, a pressure drop which is substantially independent of the ratio of the air delivery passing through passage 5 and the total air delivery from compressor 2 but which varies in the same sense as the pressure in passage 5 upstream of the restricting means 13.

As FIGS. 1 and 2 show, the restricting means 13, which can take the form of a pivotable flap or a sliding or rotating plug or cock or the like, are controlled by a differential plunger 14 having two pistons 15, 16 which are of different cross-section from one another and between which a duct 17 is provided so that the pressure in passage 5 upstream of the restricting means 13 is present between the pistons 15 and 16. On its other surface the smaller piston 15 experiences atmospheric pressure while the larger piston 16 experiences on its other surface the pressure which exists in passage 5 downstream of the restriction 13 and which acts through a duct 18. Plunger 14 is movable in a stationary differential cylinder 19. The system embodied by the cylinder 19, plunger 14, restricting means 13 and the mechanism connecting the same to the pluunger 14 is such that the required pressure drop across the means 13 is produced.

Of course, the restricting means 13 and their plunger situation can, instead of being embodied by separate elements, be combined as described in U.S. Pat. No. 3,988,894 and have various refinements described therein, such as dampers, return springs and so on.

As provided by the present invention, the passage 5 is divided into two parallel arms 5a, 5b. The arm 5a contains the restricting means 13 and terminates downstream of the primary combustion zone 10, and the arm 5b, communicates with the zone 10 via at least one orifice 20 of a cross-section such that the required pressure drop is also produced across such orifice. The fuel supply system 11 has an injector 21 opening into the primary zone 10 in the region of the turbulence produced by the arrival of air through the orifice 20. The pressure drop referred to is not produced by the flow of air through the or each orifice 20 but is the result of the restricting means 13 since the same produce the pressure drop irrespective of the rate of flow therethrough.

Figure 3:
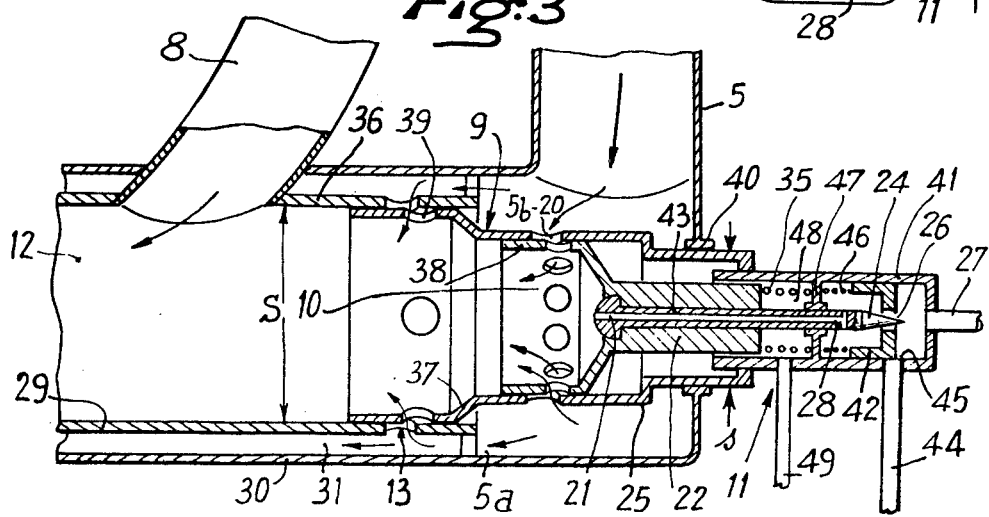
FIG. 3 is a view in axial section and to an enlarged scale of an auxiliary combustion chamber in which the means for adjusting air and fuel supply is different from that of FIGS. 1 and 2.

The power plant comprises adjusting means for producing a correlative variation of the cross-section of the orifice or orifices 20 and of the effective delivery of the fuel supply system 11. In the case shown in FIGS. 1 and 2, the adjusting means comprise a pilot element 22, diagrammatically represented by a lever which is mechanically connected to a sliding sleeve 23 and to an adjusting needle or valve 24. Sleeve 23 is guided on the outside surface of a casing 25 which forms the boundary of the primary zone 10 which closes the second arm 5b of passage 5, the only free cross-section which is available to the air being in the form of a ring of orifices 20 extending through casing 25. Sleeve 23 covers the orifice 20 to a varying extent and thus adjusts their effective cross-section. Valve 24 controls the effective cross-section of an orifice 26 which is connected at its upstream end through a duct 27 to a pressurised fuel source (not shown) and at its downstream end through a duct 28 to injector 21. The elements 21, 24, 27, 28 form part of the fuel supply system 11. A cooling air circuit for various parts of the engine, terminating at its downstream end at the inlet of turbine 3, can be taken from arm 5a of passage 5, either downstream of the restriction 13 as shown in FIG. 2 or upstream thereof as shown in FIG. 3. Advantageously, this feature is embodied by means of two coaxial and substantial cylindrical members 29, 30, the inner member 29 being connected to the second passage arm 5b, receiving the primary-zone casing 25 serving as the internal boundary for the secondary zone 12. The exhaust ducts 8 extend into the inner member 29. The two members 29, 30 bound therebetween an annular chamber 31 which is connected to the first passage arm 5a and which serves as the cooling circuit, inter alia for the inner member 29.

In the embodiment of FIG. 1, secondary air for dilution is introduced into the inner member 29 through orifices 32 which extend therethrough downstream of the place where the exhaust ducts 8 join the member 29 (as described in U.S. Pat. No. 3,849,988 )and through which the entire delivery of the first passage arm 5a goes.

In the embodiment of FIG. 2, most of the secondary air is introduced into the inner member 29 through relatively large cross-section orifices 33 which extend through the member 29 upstream of the place where it is joined by the exhaust ducts 8; the remainder of the secondary air, after cooling some parts of the engine, enters the inner member 29 through relatively small cross-section orifices 34 which extend therethrough at the same place as the orifices 32 of the embodiment shown in FIG. 1. The air flowing through the passage arm 5a is distributed between the secondary zone 12 and that part of the annular chamber 31 which is beyond the orifices 33 substantially in the ratio of the cross-sections of all the orifices 33 to all the orifices 34.

Figure 4:
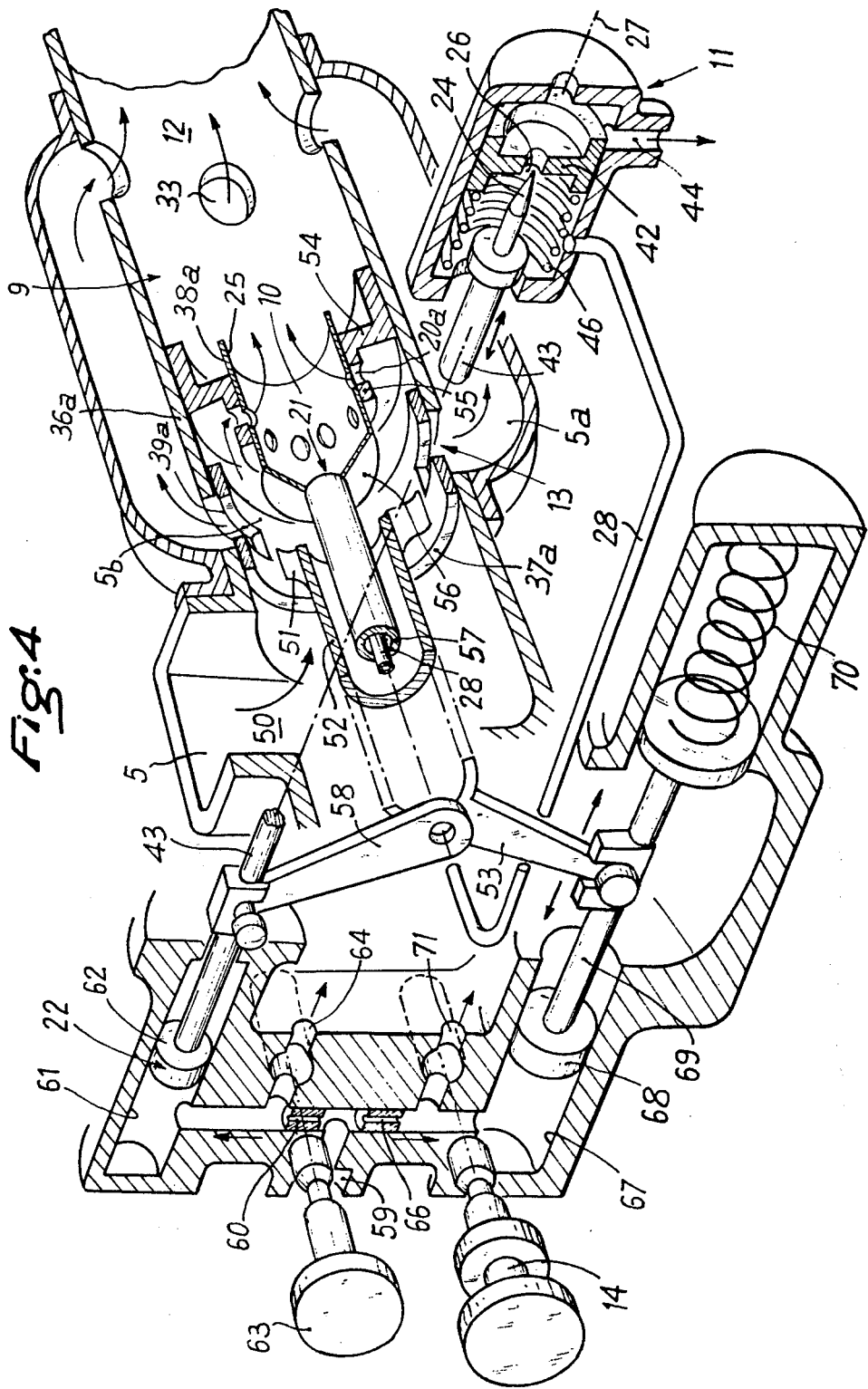
FIG. 4 is a perspective view of an alternative form of the auxiliary combustion chamber of FIG. 3.

The embodiments shown in FIGS. 3 and 4 have two refinements lacking in the two embodiments hereinbefore described.

As a first refinement, the pilot element 22 is responsive to the pressure which exists anywhere in the gas circuit connecting the compressor output to the turbine input and is so devised that the cross-section of the orifice or orifices 20 and the effective delivery of the fuel supply system 11 both vary, at least in the range of movement of sleeve 23, in the opposite send to such pressure and, as previously stated, in the opposite sense to the difference between the pressure upstream and downstream, respectively, of the orifices 20. Accordingly, the pilot element 22 is biased against such pressure by the combined action of a return spring 35 (which is not shown in FIG. 4 but which can be seen in FIG. 6) and of an adjustable counter-pressure or back pressure.

As a second refinement, the restricting means 13 associated with the first passage arm 5a are disposed at the junction (FIG. 3) or near the junction (FIG. 4) between the arm 5a and the secondary zone 12.

Accordingly, the means 13 and the adjusting means for varying the cross-section of the orifice or orifices 20 comprise three hollow coaxial elements, one, 36 or 36a, of which is stationary while the other two, 37 or 37a, 38 or 38a, are movable independently of one other. The stationary element 36 or 36a is the boundary for at least some of the secondary zone 12 and cooperates with the first movable element 37 or 37a as a means of embodying the restricting means 13, to bound a first series of orifices 39 or 39a whose cross-section varies with the position of the movable element 37 or 37a. The second movable element 38 or 38a cooperates with one of the other two elements, i.e., the first movable element 37 in FIG. 3 and the stationary element 36a of FIG. 4, as means of embodying the adjusting means, to bound a second series of orifices 20 or 20a whose cross-section varies with the position of the second movable element 38 or 38a.

In the embodiment shown in FIG. 3, the two movable elements 37, 38 are adapted to slide axially relative to the stationary element 36, element 38 being disposed in element 37 which is in turn disposed in element 36. The job of the stationary hollow member 36 is similar to that of the member 29 of FIGS. 1 and 2; element 36 receives the exhaust ducts 8 and bounds with the outer member 30 the annular cooling chamber 31. The orifices 39 are disposed in a ring on the two elements 36, 37 so that orifice cross-section is varied by movement of the element 37.

The movable element 37 is led out of passage 5 through a sealing element 40 such as a gasket, diaphragm, gaiter or the like such that the element 37 can slide. Outside passage 5 the element 37 carries a cylinder 41 in which the pilot element 22 can slide. The pilot element 22 is a plunger rigidly secured to the inner hollow member 38. The orifices 20 are so arranged in a ring in the two elements 37 and 38 that sliding thereof relatively to one another varies the cross-section of the orifices 20.

Slidable in cylinder 41, in the manner disclosed by U.S. Pat. No. 3,988,894, is a free piston 42 formed with the orifice 26 controlling fuel delivery. Extending into orifice 26 is a needle valve 24 which forms one of the ends of a rod 43 extending axially through the pilot element 22. Rod 43 has an inner longitudinal passage which serves as the duct 28 (cf. FIGS. 1 and 2) and which terminates at injector 21 which is at the end of element 22.

The fuel supply line 27 terminates at the end of cylinder 41. Excess fuel is removed through a line 44 by way of a port 45 whose cross-sectional opening is controlled by the free piston 42. The same moves in response to the opposing actions of the pressure of the fuel supplied through line 27 and of a return spring 46 which bears on a hermetic partition 47 extending transversely across the bore of cylinder 41. At its upstream end the longitudinal passage or line 28 terminates between the free piston 42 and the partition 47. On the other side of partition 47 the pilot element 22 bounds a chamber 48; extending thereto is a line 49 through which the pneumatic backpressure is operative in chamber 48. Spring 35 is received in chamber 48 and bears therein on partition 47.

That end of the hollow element 37 which is led out through the seal 40 has a cross-section $s$ which experiences atmospheric pressure; the cross-section $s$ is smaller than the cross-section S of the other end of the element 37, the last-mentioned end being disposed upstream of the exhaust ducts 8. Since the outside surface of the element 37, less the portion led out through the seal 40, experiences the compressor delivery pressure $P_2$ — i.e., the relative pressure in the passage 5 upstream of the restricting means 13 or orifices 39 — the pressure drop $\Delta P$ produced by the means 13 is such that $(\Delta P/P_2) = (s/S)$ irrespective of the rate of flow through the means 13, at least until the orifices 39 are fully open.

If the strengths of the springs 35 and 46 are adjusted appropriately for a predetermined geometry of the orifices 20, 26, the air delivery to the primary zone 10 and fuel delivery from the injector 21 remain in a relationship close enough to the stoichiometric ratio to ensure satisfactory combustion stability, and the air delivery to the zone 10 and the fuel delivery from the injector 21 vary in inverse proportion to the pressure anywhere in the passage 5 (turbine inlet pressure in FIG. 3 or compressor delivery pressure in FIG. 4). The variation of the deliveries is between a maximum (turbocompressor 2, 3 operating alone or with the engine 1 idling) and a minimum by-pass or "pilot" value (which can, if required, be zero), with effect from the power at which the turbocompressor starts to operate independently just on the energy available in the engine exhaust.

The back pressure produced by the line 49 in FIG. 3 is a means of varying the control range of the system and therefore of bringing the auxiliary combustion chamber 9 back into operation as required.

The embodiment shown in FIG. 4 differs from the embodiment shown in FIG. 3 inter alia in that the movable elements 37a, 38a are rotatable instead of sliding. The annular chamber type cooling circuit 31 has been omitted from FIG. 4 just to simplify the drawing.

The stationary element 36a is cylindrical and comprises an air inlet 50 where that part of passage 5 which comes from compressor 2 extends, a first ring or orifices acting as the first set of orifices 39a and a second ring or orifices 33. The movable element 37a, which is also cylindrical and which is formed with a ring of orifices serving as the second set of orifices 39a, can rotate on the inner wall of the stationary element 36a. Spoke-like members 51 and a sleeve 52 connect element 37a to a first actuating lever 53.

A transverse harmetic partition 54 connects the stationary element 36a to a stationary cylindrical sleeve 55. The movable element 38a, which is also cylindrical, can rotate on the inner wall of sleeve 55, the elements 38a and the sleeve 55 being formed with two rings of orifices 20a. A transverse hermetic partition 56 which forms the base of the combustion chamber primary zone 10, and a sleeve 57, connect the element 38a to a second actuating lever 58 which rod 43 connects to the pilot element 22. Sleeve 52 extends coaxially around sleeve 57 through which extends the duct 28 which carries the injector 21 at the end near the primary zone 10.

FIG. 6 is a diagram of the means providing correlative adjustment of primary air delivery and fuel delivery in the embodiment of FIG. 4, like elements having the same reference numbers as in the previous figures. The driving fluid for the latter means is fuel supplied through a duct 59 at a constant pressure. Downstream of a jet 60 the line 59 extends into a cylinder 61 in which slides a piston 62 which is similar tp the pilot element 22 of FIG. 3 and which is biased by the return spring 35 (not shown in FIG. 4) and by pressure of the fuel in cyliner 61. Piston 62 is rigidly secured to rod 43. The fuel leaves cylinder 61 by leaking away, under the control of a richness control piston 63, to a fuel tank return line 64, piston 63 being biased by a return spring 63 in one direction and experiencing in the other direction an adjustable pressure acting through a line 49a. Preferably, the latter pressure is proportional to the pressure anywhere in the passage 5, e.g. at the compressor oulet, the proportionality factor being adjustable as required.

FIG. 5 is a diagram of the controller used in the embodiment of FIG. 4 to control the pressure drop $\Delta P$. The driving fluid for the controller is fuel supplied through line 59 under pressure. Downstream of a jet 66 the line 59 extends into a cylinder 67 in which slides a piston 68 having a rod 69 connected to actuating lever 53. Piston 68 is biased by a return spring 70 and experiences the pressure of the fuelin the cylinder 67. The fuel leaks out of cylinder 67, under the control of a control piston 14 (devised as described with reference to FIGS. 1 and 2), to a tank return line 71.

The embodiment shown in FIGS. 4 to 6 operates in just the same way as the embodiment of FIG. 3 except that in FIGS. 4 to 6 the actuating mechanism are hydraulically assisted and the control range of the control element of FIG. 6 is varied by direct action on the pressure in the line 49a.

In any case, such turbulence occurs at the exit from the orifices 20 or 20a that the fuel injected into the primary zone 10 burns therein in optimum conditions. The turbulence is provided without loss of power since the restricting means 13 causing it existed prior to this invention.

Figure 7:
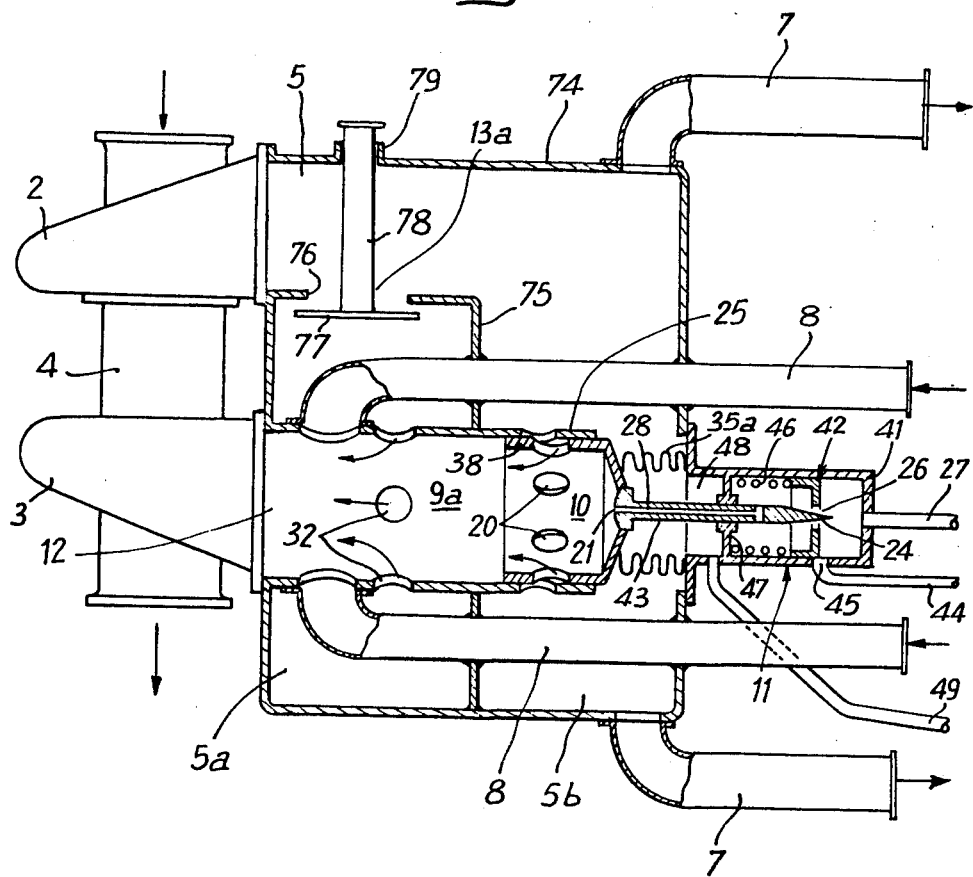
FIG. 7 is a partial diagrammatic plan view, with parts sectioned, of a power plant in which the auxiliary combustion chamber is a modified form of that shown in FIG. 3.

The main differences in the embodiment shown in FIG. 7 from the embodiment shown in FIG. 3 is that the restricting means 13a producing a controlled pressure drop are dissociated from the variable-geometry combustion chamber 9a. In FIG. 7 the passage 5 is bounded by a box member 74 from which two inlet lines 7 extend and which is bounded by a partition 75, the arm 5a being formed downstream of partition 75. Partition 75 is pierced with an aperture whose edges form a seat 76 cooperating with a closure disc 77 disposed downstream of such seat. Disc 77 is rigidly secured to a rod 78 which extends through seat 76 and, with the interposition of sealing means 79, through the outer wall of the box member 74. The disc 77 and rod 78, which in this case embody the restricting means 13a are in an equilibrium state between, on the one hand, atmospheric pressure acting on the cross-section of rod 78 at the top of or outside the same and, on the other hand, the pressure which act upstream and downstream of the disc 77 on the top surface and bottom surface respectively of disc 77. If $s_1$ denotes the cross-section of rod 78, $S_1$ denotes the area of disc 77, $P_o$ denotes atmospheric pressure, and $P_2$, $P_3$ denote the pressure upstream and downstream, respectively, of disc 77, the equilibrium condition can be stated as:

$$\frac{P_2 - P_3}{P_2 - P_0} = \frac{s_1}{S_1}$$

The combustion chamber 9a is bounded by a sleeve 25, which is stationary relatively to box member 74, and by a sliding sleeve 38 devised and actuated like sleeve 38 of FIG. 3. The only differences are that the spring 35 of FIG. 3 is replaced by a resilient gaiter or bellows or the like 35a, serving as a sealing element between chamber 48 and passage arm 5b, while the cylinder 41 is secured to the box member 74.

What we claim is:

1. A power plant comprising an internal combustion engine; turbocompressor set for supercharging the engine and comprising a compressor, a turbine driving the same and a passage communicating with the compressor outlet and the turbine inlet and serving to return to the turbine all that part of the compressor delivery which does not pass through the engine, the engine comprising a variable-volume working chamber so communicating via an inlet duct with the compressor outlet and via an exhaust duct with the turbine input as to be in parallel with at least some of the passage; an auxiliary combustion chamber divided into an upstream primary combustion zone, to which fresh air is supplied through the passage and fuel is supplied by a fuel supply system, and a downstream secondary dilution zone, to which fresh air is supplied through the passage and combustion gases through the exhaust duct, the secondary zone delivering hot gases to the turbine to help drive the same; and restricting means in the passage adapted to produce, between the air leaving the compressor and the gases entering the turbine, a pressure drop which is substantially independent of the ratio of the rate of air flow through the passage to the total air delivery from the compressor but which varies in the same direction as the pressure in such passage upstream of the restricting means; in which power plant the passage is divided into two parallel arms, a first such arm having the restricting means and terminating downstream of the primary combustion zone, the second arm of the passage being connected to the primary zone via at leat one orifice of a cross section such that the pressure drop is produced substantially between the upstream and downstream ends of the orifice, and the fuel supply system entering the primary zone in the region of the turbulence produced therein by the arrival of air through the orifices.

2. A power plant according to claim 1 comprising adjusting means for providing a correlative variation of the cross section of at least one orifice and the effective delivery of the fuel supply system so as to provide in the auxiliary combustion chamber conditions close enough to the stoichiometric ratio for stable combustion in the latter chamber.

3. A power plant according to claim 2 in which restricting means of the passage and the adjusting means for varying the cross section of at least one orifice comprise three hollow coaxial elements, one of which is stationary and the other two of which are movable independently of one another, the stationary element bounding at least some of the secondary zone of the auxiliary combustion chamber and cooperating with the first movable element to form the restricting means, to bound a first series of orifices whose cross section varies with the position of the first movable element, the second movable element cooperating with one of the other two elements, to form the adjusting means, to bound a second series of orifices whose cross section varies with the position of the second movable element.

4. A power plant according to claim 2 in which adjusting means are controlled by a pilot element sensitive to a pressure at any place in the gas circuit connecting the compressor outlet to the turbine inlet, the pilot element being such that the cross section of the or each orifice and the effective delivery of the fuel supply system both vary, at least between a maximum and a minimum, in the opposite sense to the last-mentioned pressure.

5. A power plant according to claim 3 in which adjusting means are controlled by a pilot element sensitive to a pressure at any place in the gas circuit connecting the compressor outlet to the turbine inlet, the pilot element being such that the cross section of the or each orifice and the effective delivery of the fuel supply system both vary, at least between a maximum and a minimum, in the opposite sense to the last-mentioned pressure.

6. A power plant according to claim 4 in which the pilot element is biased against the pressure operative at the selected place in the gas circuit by the combined action of a return spring and an adjustable counterpressure.

7. A power plant according to claim 5 in which the pilot element is biased against the pressure operative at the selected place in the gas circuit by the combined action of a return spring and an adjustable counterpressure.

8. A power plant according to claim 1 in which a cooling air circuit for various engine elements and extending at its downstream end to the turbine inlet is taken from the first passage arm directly connected to the secondary zone and preferably joining the same upstream of the exhaust duct entry into such zone.

9. A power plant according to claim 2 in which a cooling air circuit for various engine elements and extending at its downstream end to the turbine inlet is taken from the first passage arm directly connected to the secondary zone and preferably joining the same upstream of the exhaust duct entry into such zone.

10. A power plant according to claim 3 in which a cooling air circuit for various engine elements and extending at its downstream end to the turbine inlet is taken from the first passage arm directly connected to the secondary zone and preferably joining the same upstream of the exhaust duct entry into such zone.

11. A power plant according to claim 4 in which a cooling air circuit for various engine elements and extending at its downstream end to the turbine inlet is taken from the first passage arm directly connected to the secondary zone and preferably joining the same upstream of the exhaust duct entry into such zone.

12. A power plant according to claim 5 in which a cooling air circuit for various engine elements and extending at its downstream end to the turbine inlet is taken from the first passage arm directly connected to the secondary zone and preferably joining the same upstream of the exhaust duct entry into such zone.

13. A power plant according to claim 6 in which a cooling air circuit for various engine elements and extending at its downstream end to the turbine inlet is taken from the first passage arm directly connected to the secondary zone and preferably joining the same upstream of the exhaust duct entry into such zone.

14. A power plant according to claim 7 in which a cooling air circuit for various engine elements and extending at its downstream end to the turbine inlet is taken from the first passage arm directly connected to the secondary zone and preferably joining the same upstream of the exhaust duct entry into such zone.

15. A power plant according to claim 8 in which the restricting means in the first passage arm are disposed at or near the junction thereof with the secondary zone of the auxiliary combustion chamber.

16. A power plant according to claim 9 in which the restricting means in the first passage arm disposed at or near the junction thereof with the secondary zone of the auxiliary combustion chamber.

17. A power plant according to claim 10 in which the restricting means in the first passage arm are disposed at or near the junction thereof with the secondary zone of the auxiliary combustion chamber.

18. A power plant according to claim 11 in which the restricting means in the first passage arm disposed at or near the junction thereof with the secondary zone of the auxiliary combustion chamber.

19. A power plant according to claim 12 in which the restricting means in the first passage arm are disposed at or near the junction thereof with the secondary zone of the auxiliary combustion chamber.

20. A power plant according to claim 13 in which the restricting means in the first passage arm are disposed at or near the junction thereof with the secondary zone of the auxiliary combustion chamber.

21. A power plant according to claim 14 in which the restricting means in the first passage arm are disposed at or near the junction thereof with the secondary zone of the auxiliary combustion chamber.

22. A power plant according to claim 17 in which the second movable element is disposed inside the first movable element, cooperates therewith to bound the secondary series of orifices and delimits the secondary zone of the auxiliary combustion chamber.

23. A power plant according to claim 19 in which the second movable element is rigidly secured to the pilot element and in which the second movable element is disposed inside the first movable element, cooperates therewith to bound the second series of orifices and delimits the secondary zone of the auxiliary combustion chamber.

24. A power plant according to claim 3 in which the two movable elements each cooperate with the stationary element to bound the two series of variable cross-section orifices, the movable element which bounds the second series of orifices delimiting the secondary zone of the auxiliary combustion chamber.

25. A power plant according to claim 1 in which the engine is of the compression ignition kind.

26. A power plant according to claim 21 in which the engine is of the compression ignition kind.

27. A power plant according to claim 1 in which the passage communicates continuously with the compressor outlet and the turbine input.

28. A power plant according to claim 26 in which the passage communicates continuously with the compressor outlet and the turbine input.

* * * * *

UNITED STATES PATENT OFFICE
CERTIFICATE OF CORRECTION

PATENT NO. : 4,026,115
DATED : May 31, 1977
INVENTOR(S) : Jean F. Melchior and Thierry Andre It is certified that error appears in the above-identified patent and that said Letters Patent are hereby corrected as shown below:

Column 1, line 16 - "input" should be --inlet--
Column 2, line 2 - "stoichi" should be --stoichio--
Column 2, line 45-47 - "French Patent Application No. 73 10041 previously referred to" should be --U.S. Pat. No. 3,988,894--
Column 3, line 38 - "input" should be --inlet--
Column 4, lines 44-45 - "plunger situation" should be "differential plunger control--
Column 5, line 58 - "output" should be --outlet--
Column 5, line 59 - "input" should be --inlet--
Column 7, line 56 - "elements" should be --element--
Column 8, line 51 - "edges form" should be -- edges forms --
Column 8, line 66 - before word "up-", "pressure" should be -- pressures --
Column 9, line 15 - before "turbocompressor" insert --a--
Column 9, line 23 - "input" should be --inlet--
Column 12, line 28 - "input" should be --inlet--
Column 12, line 31 - "input" should be --inlet--

UNITED STATES PATENT OFFICE
CERTIFICATE OF CORRECTION

PATENT NO. : 4,026,115
DATED : May 31, 1977
INVENTOR(S) : Jean F. Melchior and Thierry Andre It is certified that error appears in the above-identified patent and that said Letters Patent are hereby corrected as shown below:

Column 2, line 39  - "fouund" should be -- found --
Column 2, line 63  - Insert the word --system-- after the word "supply" and before the word "both"
Column 3, line 24  - "limmitation" should be --limitation--
Column 4, line 17  - "turbine 2" should be --turbine 3--
Column 4, line 41  - "pluunger" should be --plunger--
Column 5, line 9   - "orifice" should be --orifices--
Column 5, line 15  - "A cooling air..." should be a new paragraph
Column 5, line 21  - "substantial" should be --substantially--
Column 5, line 23  - "arrm" should be --arm--
Column 5, line 62  - "send" should be --sense--
Column 5, line 64  - "pressure" should be --pressures--
Column 6, line 1   - "couunter" should be --counter--
Column 6, line 12  - "other" should be --another--
Column 7, line 14  - "(s/S" should be --(s/S)--
Column 7, line 53  - "harmetic" should be --hermetic--
Column 8, line 5   - "tp"should be --to--
Column 8, line 7   - Insert --the-- after the word "by" and before the word "pressure"
Column 8, line 26  - "fuelin" should be --fuel in --
Column 8, line 62  - "pressure" should be --pressures--
Column 9, line 44  - "leat" should be --least--
Column 11, line 12 - Insert the word --are-- after the word "arm" and before the word "disposed"

UNITED STATES PATENT OFFICE
CERTIFICATE OF CORRECTION

PATENT NO. : 4,026,115
DATED : May 31, 1977
INVENTOR(S) : Jean F. Melchior and Thierry Andre It is certified that error appears in the above-identified patent and that said Letters Patent are hereby corrected as shown below:

Column 11, line 20 - Insert the word --are-- after the word "arm" and before the word "disposed"

Column 12, line 6 - Before the word "series", "secondary" should be --second--

Signed and Sealed this

Eighteenth Day of April 1978

[SEAL]

Attest:

RUTH C. MASON
Attesting Officer

LUTRELLE F. PARKER
Acting Commissioner of Patents and Trademarks